United States Patent [19]

Langenbrunner et al.

[11] Patent Number: 5,662,757
[45] Date of Patent: Sep. 2, 1997

[54] METHOD OF REMOVING AN ABRADABLE SHROUD ASSEMBLY FOR TURBOMACHINERY

[75] Inventors: Leslie L. Langenbrunner; Paul F. Proffitt, both of Cincinnati, Ohio

[73] Assignee: General Electric Company, Cincinnati, Ohio

[21] Appl. No.: 650,680

[22] Filed: May 20, 1996

Related U.S. Application Data

[62] Division of Ser. No. 323,978, Oct. 17, 1994, abandoned.
[51] Int. Cl.$^6$ .................................................. B32B 3/00
[52] U.S. Cl. .................. 156/94; 156/298; 156/309.6; 156/309.9; 156/320; 156/321; 156/322; 156/313
[58] Field of Search .................... 156/94, 298, 309.6, 156/309.9, 320, 321, 322, 313

[56] References Cited

U.S. PATENT DOCUMENTS

| | | | |
|---|---|---|---|
| 3,825,371 | 7/1974 | Roder et al. | 416/224 |
| 3,843,278 | 10/1974 | Torell | 415/174 |
| 4,460,185 | 7/1984 | Grandey | 277/53 |
| 5,240,645 | 8/1993 | Strecker | 252/511 |
| 5,264,059 | 11/1993 | Jacaruso et al. | 156/148 |

*Primary Examiner*—Archene Turner
*Attorney, Agent, or Firm*—Andrew C. Hess; David L. Narciso

[57] ABSTRACT

A bonded assembly which includes a heating element in thermal contact with the adhesive component of the bonded assembly, such that the heating element can serve to thermally degrade the adhesive so as to allow disassembly, repair and servicing of the bonded assembly. The invention is particular suited for use in an abradable shroud assembly used in the fan section of a turbomachine, such as a high bypass turbofan engine. The abradable shroud assembly includes an abradable material bonded to the fan casing with an adhesive material having a known thermal degradation temperature. Placed in thermal contact with the adhesive layer is a heating element, such that the heating element is capable of heating the adhesive to a temperature above its thermal degradation temperature. As such, the adhesive can be heated with the heating element to a temperature sufficient to thermally degrade the adhesive, and thereby permit removal of the abrasive material without first requiring disassembly the engine and without the use of powered machine tools to forcibly remove the abradable material.

8 Claims, 2 Drawing Sheets

METHOD OF REMOVING AN ABRADABLE SHROUD ASSEMBLY FOR TURBOMACHINERY

This application is a division, of application Ser. No. 08/323,978, filed Oct. 17, 1994, now abandoned.

The present invention generally relates to abradable shroud assemblies for use in turbomachinery, such as gas turbine engines. More particularly, this invention relates to an improved abradable shroud assembly for a turbofan engine, in which an abradable panel is adhered to a fan case with an adhesive layer having a heating element imbedded therein, wherein the heating element serves to decompose the adhesive layer in order to facilitate removal of the abradable panel from the fan case.

BACKGROUND OF THE INVENTION

Gas turbine engines generally operate on the principle of compressing air within a compressor section of the engine, and then delivering the compressed air to the combustion section of the engine where fuel is added to the air and ignited. Afterwards, the resulting combustion mixture is delivered to the turbine section of the engine, where a portion of the energy generated by the combustion process is extracted by a turbine to drive the engine compressor. High bypass turbofan engines are widely used for high performance aircraft which operate at subsonic speeds. High bypass turbofan engines have a large fan placed at the front of the engine which serves to produce greater thrust and reduce specific fuel consumption. The fan serves to compress incoming air, a portion of which is then delivered to the combustion chamber, though a larger portion is bypassed to the rear of the engine to generate additional engine thrust.

The fan is contained within a fan case equipped with a shroud, such that the shroud circumscribes the fan and is adjacent to the tips of the fan blades. The shroud serves to channel incoming air through the fan so as to ensure that the bulk of the air entering the engine will be compressed by the fan. However, a small portion of the air is able to bypass the fan blades through a radial gap present between the fan blade tips and the shroud. Because the air compressed by the fan blades is used to generate thrust and feed the turbine section of the engine, engine efficiency can be increased by limiting the amount of air which is able to bypass the fan blades through this gap. Accordingly, the fan and shroud are manufactured to close tolerances in order to minimize the gap.

However, manufacturing tolerances, differing rates of thermal expansion and dynamic effects limit the extent to which this gap can be reduced. Furthermore, during the normal operation of an aircraft turbofan engine, the fan blades may rub the shroud as a result of a hard landing or a hard maneuver of the aircraft. Any rubbing contact between the fan blade tips and the shroud will abrade the tips of the rotors, tending to further increase the gap between the shroud and blade tips, thereby reducing engine efficiency. Accordingly, it is well known in the art to cover the portion of the shroud adjacent the blade tips with an abradable material, such that the abradable material will sacrificially abrade away when rubbed by the fan blades. Inherently, as the abradable material is removed, the gap between the blade tips and the surface of the abradable material will increase, necessitating that the abradable material be restored in order to maintain desirable aerodynamic efficiencies associated with a smooth abradable surface and a small gap between the abradable surface and the fan blades.

Various materials and processes have been suggested to form and restore the abradable surface. A common method of restoring the abradable surface is to completely machine out the old abradable material and bond a panel formed of the abradable material in its place. However, this process is time consuming and expensive. The shroud must be disassembled from the engine and placed on a turning machine to remove the old abradable material. Bonding new material in its place typically requires an oven in which the adhesive used to adhere the new material to the shroud is cured. The above requires a large maintenance facility to which at least the front of the engine must be transported for disassembly. Due to the special equipment required to perform these machining and curing operations, a limited number of facilities are available for restoring the abradable material. As a result, additional costs, scheduling and transport problems are common.

Accordingly, it would be advantageous to provide an abradable shroud assembly whose abradable material can be readily restored without requiring the entire engine to be disassembled, such that restoration can be performed in the field. In addition, such an assembly would preferably utilize existing hardware and materials so as to be compatible with turbofan engines currently in service.

SUMMARY OF THE INVENTION

It is therefore an object of this invention to provide an improved abradable shroud assembly for use in the fan section of turbomachinery, such as a gas turbine engine, in which an abradable material is bonded to the engine shroud with an adhesive which can be thermally decomposed without degrading the structural integrity of the shroud and fan blades.

It is a further object of this invention that such an assembly include a heating element imbedded in the adhesive, such that heat generated by the element is sufficient to thermally degrade the adhesive to allow removal of the abradable material.

It is yet another object of this invention that such an adhesive be heat-curable, such that heat generated by the element is also sufficient to thermally cure the adhesive applied so as to bond new abradable material to the shroud.

In accordance with a preferred embodiment of this invention, these and other objects and advantages are accomplished as follows.

According to the present invention, there is provided an abradable shroud assembly for use in the fan section of a turbomachine, such as a high bypass turbofan engine. The abradable shroud assembly generally circumscribes the entire fan within the fan section, with a radial gap being present between the blade tips of the fan and an abradable material which forms a component of the assembly. The abradable shroud assembly includes a casing member having an interior surface adapted to be disposed adjacent the blade tips of the fan blades within the fan section. Covering a portion of the interior surface of the casing member is an adhesive layer which bonds the abradable material to the casing member. The adhesive layer is composed of an adhesive material having a known thermal degradation temperature. Placed in thermal contact with the adhesive layer is a heating element, such that the heating element is capable of heating the adhesive layer to a temperature above its thermal degradation temperature. If the heating element is an electrical resistance heating element, an electrically insulative layer is preferably provided between the heating element and the fan case so as to prevent electrical shorting and ensure uniform heating along the heating element.

The above structure enables the abradable shroud assembly to be restored without the requirement to first remove the assembly from the turbomachine. Generally, the method enabled by this invention involves heating the adhesive above its thermal degradation temperature with the heating element, such that the adhesive sufficiently degrades to debond the abradable material from the shroud member. The abradable material can then be readily removed so as to allow new abradable material to be bonded to the shroud member. Following removal of the abradable material, a layer of new adhesive is applied to the shroud member, followed by a layer of new abradable material, such that the heating element is again positioned between the new abradable material and the shroud member.

The adhesive is preferably heat-curable such that the heating element can be employed to heat the adhesive to its curing temperature, and thereby permanently bond the new abradable material to the shroud member with the adhesive. Again, the restoration of the abradable material can be performed without the abradable shroud assembly being removed from the fan section of the turbomachine.

Ideally, the temperature of the adhesive layer is sensed during the heating step to enable the temperature of the adhesive layer to be controlled. As such, the temperature of the adhesive layer can be prevented from exceeding a level which would cause degradation of the shroud member during the curing process.

Other objects and advantages of this invention will be better appreciated from the following detailed description.

BRIEF DESCRIPTION OF THE DRAWINGS

The above and other advantages of this invention will become more apparent from the following description taken in conjunction with the accompanying drawings, in which.

DETAILED DESCRIPTION OF THE INVENTION

Figure 1:
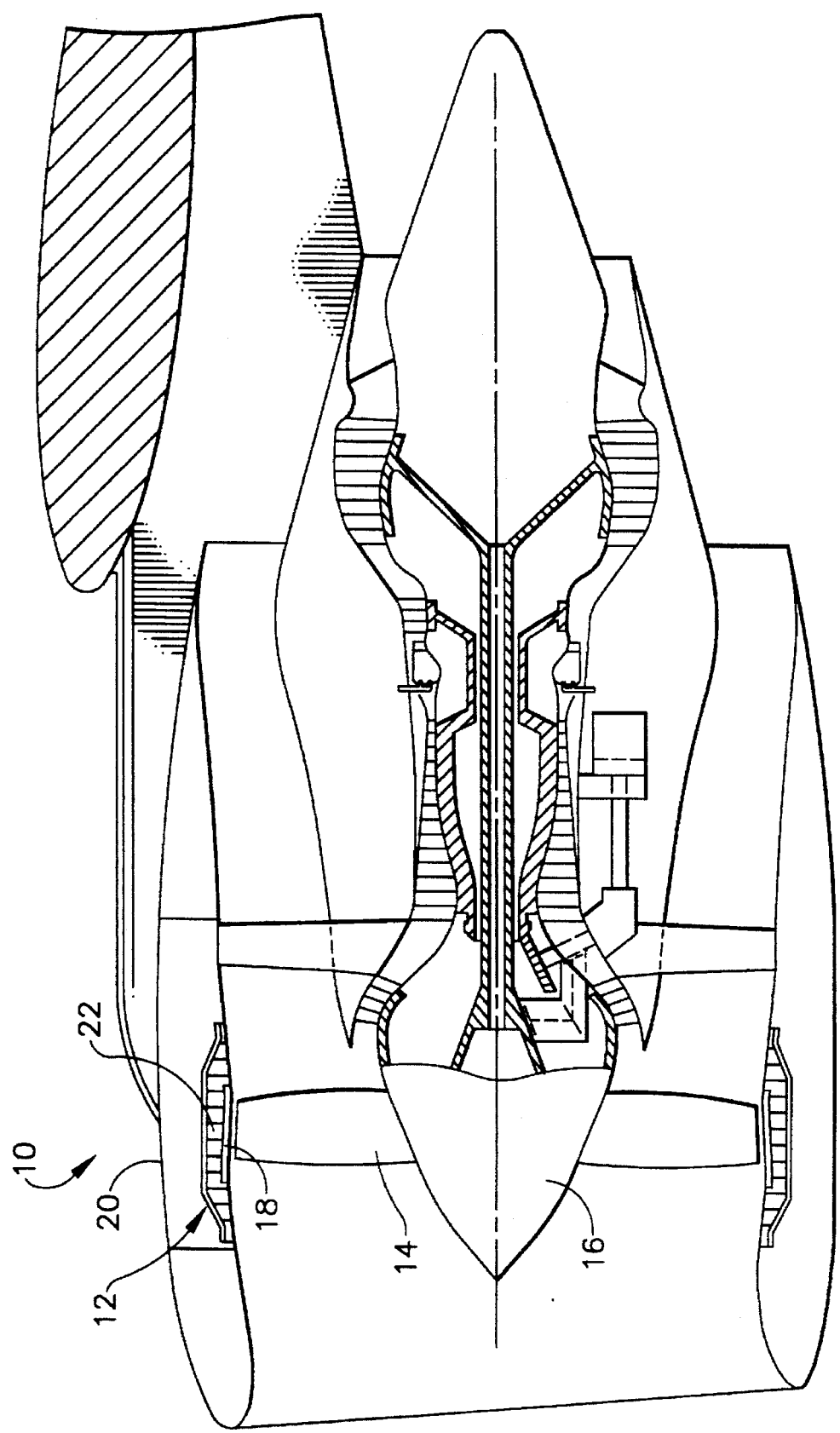
FIG. 1 is a cross-sectional view of a high bypass turbofan engine of a type known in the art.

The present invention provides an improved abradable shroud assembly for use in turbomachinery, such as a high bypass turbofan engine 10 shown in FIG. 1. As shown, the engine 10 includes a fan formed by a number of fan blades 14 mounted to a hub 16, and located within the fan section 20 of the engine 10. Circumscribing the fan is a fan containment structure 12 which includes an energy absorbing structure 22. The fan containment structure 12 serves to absorb energy from fan blade fragments which may be ejected, and prevents those fragments from causing extensive damage to the engine 10.

Figure 2:
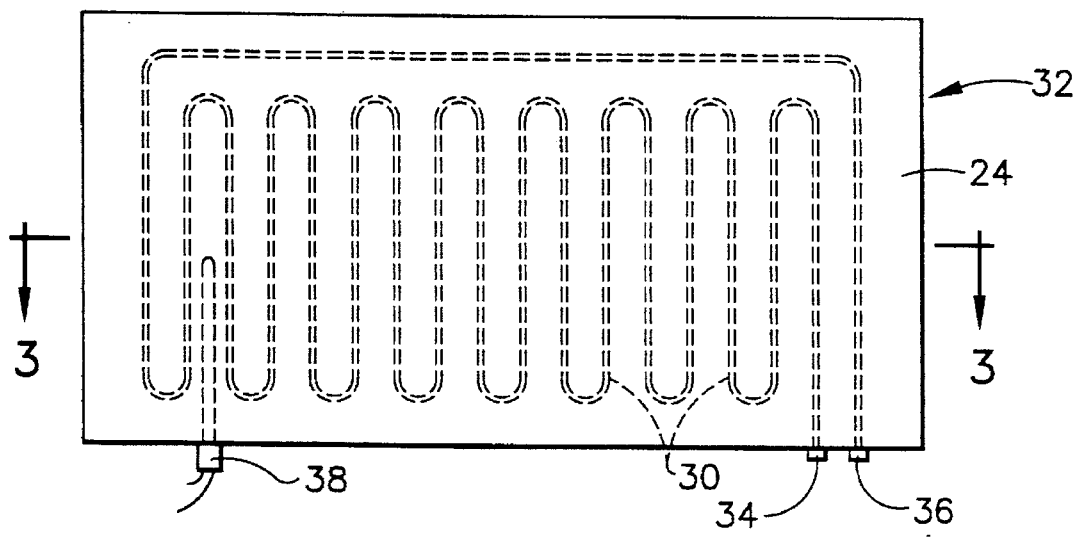
FIG. 2 is a plan view of an abradable shroud assembly suitable for use with the engine shown in FIG. 1.
Figure 3:
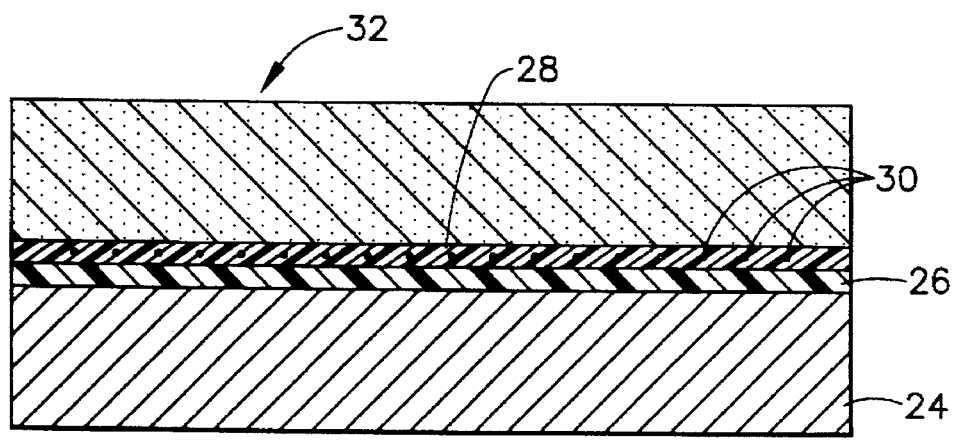
FIG. 3 is a cross-sectional view of the abradable shroud assembly of FIG. 2.

The radially inward surface of the fan containment structure 12 forms a fan casing 24 which supports an abradable shroud structure 32, as shown in greater detail in FIGS. 2 and 3. The abradable shroud structure 32 serves to channel the incoming air through the fan so as to ensure that the bulk of the air entering the engine 10 will be compressed by the fan. An abradable material 18 is present on the abradable shroud structure 32 immediately adjacent the tips of the fan blades 14. A small radial gap is present between the tips of the fan blades 14 and the abradable material 18. It is this gap which must be minimized in order to promote the efficiency of the engine 10.

In accordance with this invention, the abradable material 18 is adhered to the fan casing 24 with an adhesive 28 in which a heating element 30 is imbedded, as shown in FIG. 3. As such, the heating element 30 forms an integral part of the abradable shroud structure 32 surrounding the fan. By energizing the heating element 30, the temperature of the adhesive 28 can be sufficiently raised to thermally degrade the adhesive 28, such that the abradable material 18 can be readily removed to permit a new layer of abradable material 18 to be adhered to the shroud 24.

With further reference to FIG. 3, the abradable shroud structure 32 surrounding the fan is supported by the fan casing 24, which may be formed of any suitable material, such as an aluminum alloy. Overlaying the fan casing 24 is the adhesive 28, which is shown as a single layer. Imbedded in the adhesive 28 is the heating element 30, though the heating element 30 could alternatively be disposed between the abradable material 18 and the adhesive 28, or between the adhesive 28 and the fan casing 24, or between discreet layers of adhesive 28. The heating element 30 is preferably routed through the adhesive 28 in the manner represented by FIG. 2, with positive and negative terminals 34 and 36 extending from the adhesive layer 28 in order to allow a suitable power source(not shown) to be connected to the heating element 30 when required.

In a preferred embodiment, the heating element 30 is an electrical resistance wire element, of which various types and materials are known and may be interchangeably used to achieve the intent of this invention. Also shown in FIG. 2 is a temperature sensing element 38, such as a thermocouple capable of accurately sensing the temperature of the adhesive 28 within the temperature range to which the adhesive 28 must be heated in order to cause thermal degradation.

In practice, epoxy resin adhesives such as AF 163-2, available from the 3M Company, have been found to be suitable adhesive materials for purposes of this invention. Notably, such materials have a thermal degradation temperature on the order of about 280° F. (about 138° C.) to about 310° F. (about 154° C.), which is well below temperatures at which the aluminum fan casing 24 would be adversely effected. Furthermore, the preferred epoxy resin adhesives are heat-curable, which facilitates handling of the adhesive and the overall assembly process. Advantageously, with a heat-curable adhesive, the heating element 30 can also be used to cure the adhesive 28 and thereby bond the abradable material 18 to the shroud 24. The curing temperature for the preferred epoxy resin adhesives is on the order of about 200° F. (about 93° C.) to about 250° F. (about 121° C.), which is also well below temperatures at which the aluminum fan casing 24 would be adversely effected. As shown in FIG. 3, an insulation layer 26 may be present between the adhesive 28 and the shroud 24 in order to minimize heating of the fan casing 24 by the heating element 30. The insulative layer 26 may also serve to electrically insulate the heating element 30 from the fan casing 24 if the heating element 30 is not imbedded within the adhesive 28, but instead is disposed between the adhesive 28 and the fan casing 24. Suitable materials for the insulative layer 26 are well known in the art, and include glass-filled epoxies and phenolics.

The abradable material 18 may be any suitable light weight material of the type known and used in the prior art, including composite materials. The abradable material 18 is preferably provided in the form of a solid panel, as also known in the prior art, though it is foreseeable that loose material could also be employed in the practice of this invention.

From the above, it can be seen that the abradable shroud structure 32 of this invention enables the abradable material 18 to be restored by thermally degrading the adhesive bond between the abradable material 18 and the fan casing 24. As such, the abradable shroud structure 32 need not be removed from the engine 10 in order to gain access to the abradable material 18 with a turning machine for removal. In accordance with this invention, restoration of the abradable material 18 can be performed by connecting a suitable power source to the terminals 34 and 36 of the heating element 30 in order to energize the heating element 30 and thereby heat the adhesive 28 above its thermal degradation temperature. In doing so, the adhesive 28 sufficiently degrades to debond the abradable material 18 from the fan casing 24. Typically, the abradable material 18 can then be readily removed by hand without resorting to the use of machine tools to forcibly remove the abradable material 18, as is done conventionally.

The adhesive 28 is then removed in order to allow a new layer of adhesive to be applied to the fan casing 24 in a conventional manner, such as by brushing or spraying methods. At this time, the heating element is also repositioned beneath, within or over the adhesive 28. Thereafter, a new layer of abradable material 18 is positioned over the adhesive 28, such that the heating element 30 is again positioned between the abradable material 18 and the fan casing 24. If the adhesive 28 is heat-curable, in accordance with the preferred embodiment of this invention, the heating element 30 is again energized to raise the temperature of the adhesive 28 to its curing temperature, so as to securely bond the abradable material 18 to the fan casing 24.

Ideally, the temperature of the adhesive 28 is sensed with the sensing element 38 each time the heating element 30 is energized, so as to enable accurate temperature control of the adhesive 28. In doing so, the temperature of the adhesive 28 can be prevented from exceeding that temperature which is necessary to cure or degrade the adhesive 28, depending on the operation to be performed. A programmable controller (not shown) may be used to regulate the heating operations based on the feedback temperature indicated by the sensing element 38, such that field personnel need only select which operation is to be performed—either removal or installation of the abradable material—after which the controller will energize the heating element 30 to heat the adhesive 28 to the appropriate temperature.

The controller can also be preprogrammed to meet the time and temperature requirements for curing a variety of heat-curable adhesives, so as to improve bonding consistency and reduce defects caused by operator error. As an added feature, the controller could be used in conjunction with a vacuum pump which, with a properly configured abradable shroud structure 32, could be used to draw the abradable material 18 securely against the fan casing 24 to ensure intimate contact and, therefore, a more reliable bond.

From the above, it can be seen that the present invention makes possible the restoration of abradable material within the fan section of a high bypass turbofan engine, without the requirement to remove the fan casing from the engine in order to physically machine the abradable material from the casing. Therefore, restorations can advantageously be performed in the field, as opposed to the conventional requirement for completing restorations at a limited number of repair facilities having the proper equipment for performing the necessary disassembling, machining and curing operations.

Another significant advantage of this invention is that the adhesive 28 can be thermally decomposed without adversely effecting the structural integrity of the fan casing 24 and the fan blades 14. Importantly, the temperature to which the adhesive 28 is heated can be carefully regulated using appropriate controllers of the type which is suitable for use in the field. Furthermore, this invention enables the abradable material 18 to be more reliably bonded to the fan casing 24 through the use of a heat-curable adhesive whose curing parameters are known, such that the heating element 30 can be energized to maintain a proper cure temperature for a duration which is sufficient to completely cure the adhesive 28.

Another advantage of this invention is the ability to utilize existing hardware and materials in the restoration of the abradable material, such that the invention is completely compatible with turbofan engines currently in service. Those skilled in the art will also recognize that the present invention is also applicable to other applications in which improvements in in-field serviceability are desirable for a bonded assembly. For example, the teachings of this invention can be readily applied to numerous engine and aircraft bonded parts and assemblies, including metallic and composite laminates, which require debonding in order to allow repairs or servicing to be performed. Other foreseeable applications for this invention include those in which metal, ceramic, glass, plastic and/or composite materials form a bonded structure, such as instrument panel assemblies used in the passenger compartments of automobiles, fiber optic assemblies, strain gages and bearing mountings.

In view of the above, those skilled in the art will recognize that the present invention is applicable to virtually every type of bonded assembly in which two or more members are bonded together with an adhesive, and in which separation of the members is occasionally desirable or required. The advantages of this invention can be realized by selecting an adhesive with a thermal degradation temperature which can be withstood by the other members of the assembly, and placing in thermal contact with the adhesive a heating element which can be selectively energized to heat the adhesive to a temperature above its thermal degradation temperature.

Accordingly, while our invention has been described in terms of a preferred embodiment, it is apparent that other forms could be adopted by one skilled in the art. Therefore, the scope of our invention is to be limited only by the following claims.

The embodiments of the invention in which an exclusive property or privilege is claimed are defined as follows:

1. A method comprising the steps of:
   providing a turbomachine fan section having an abradable shroud assembly and casing member, the abradable shroud assembly comprising an abradable surface formed by an abradable material that is bonded to the casing member with a heat-curable adhesive;
   heating the heat-curable adhesive with a heating element disposed between the abradable material and the casing member, the heat-curable adhesive being heated to a temperature at which the heat-curable adhesive sufficiently degrades to cause the abradable material to debond from the casing member;
   removing the abradable material and heat-curable adhesive from the casing member;
   applying a new layer of the heat-curable adhesive to the casing member;
   applying a new layer of the abradable material over the new layer of heat-curable adhesive such that the heating element is positioned between the new layer of abradable material and the casing member; and heating the new layer of heat-curable adhesive with the heating element to a temperature at which the heat-curable adhesive cures, such that the new layer of heat-curable adhesive bonds the new layer of abradable material to the casing member;

wherein the method is performed without the abradable shroud assembly being removed from the fan section.

2. A method as recited in claim 1 wherein the providing step and the step of applying the new layer of heat-curable adhesive entail imbedding the heating element in the heat-curable adhesive.

3. A method as recited in claim 1 wherein the heating element is an electrical resistance heating element.

4. A method as recited in claim 1 wherein the heat-curable adhesive is a heat-curable epoxy adhesive, and wherein the temperature at which the heat-curable adhesive is degraded is higher than the temperature at which the new layer of heat-curable adhesive is cured.

5. A method a recited in claim 1 further comprising the step of sensing the temperature of the heat-curable adhesive during the step of heating the heat-curable adhesive to debond the abradable material.

6. A method as recited in claim 5 wherein the sensing step entails controlling the heating step based on the temperature of the heat-curable adhesive, such that the temperature of the heat-curable adhesive does not cause degradation of the casing member.

7. A method as recited in claim 1 further comprising the step of sensing the temperature of the new layer of heat-curable adhesive during the step of heating the new layer of heat-curable adhesive to the temperature at which the heat-curable adhesive cures.

8. A method as recited in claim 7 wherein the sensing step entails controlling the heating step based on the temperature of the new layer of heat-curable adhesive.

* * * * *